United States Patent
Lindner et al.

(10) Patent No.: US 6,970,253 B2
(45) Date of Patent: Nov. 29, 2005

(54) OPTICAL MEASURING DEVICE

(75) Inventors: Michael Lindner, Leutenbach (DE); Vincent Thominet, Echandens (CH)

(73) Assignee: Robert Bosch GmbH, Stuttgart (DE)

( * ) Notice: Subject to any disclaimer, the term of this patent is extended or adjusted under 35 U.S.C. 154(b) by 285 days.

(21) Appl. No.: 10/110,388

(22) PCT Filed: Jul. 6, 2001

(86) PCT No.: PCT/DE01/02518
§ 371 (c)(1),
(2), (4) Date: Sep. 3, 2002

(87) PCT Pub. No.: WO02/14845
PCT Pub. Date: Feb. 21, 2002

(65) Prior Publication Data
US 2003/0048532 A1 Mar. 13, 2003

(30) Foreign Application Priority Data
Aug. 11, 2000 (DE) .......................... 100 39 239
Jul. 3, 2001 (DE) .......................... 101 31 778

(51) Int. Cl.⁷ ..................... G01B 9/02; G01B 11/24; G01N 21/00
(52) U.S. Cl. ................ 356/511; 356/497; 356/511; 356/609; 356/241.1
(58) Field of Search ................ 356/489, 495, 356/511, 512, 241.1, 601, 602

(56) References Cited

U.S. PATENT DOCUMENTS

| 4,976,524 A | | 12/1990 | Chiba |
| 5,004,339 A | * | 4/1991 | Pryor et al. .............. 356/241.1 |
| 5,175,650 A | * | 12/1992 | Takayama et al. .......... 359/716 |
| 5,905,595 A | * | 5/1999 | Minami ..................... 359/618 |
| 5,933,231 A | * | 8/1999 | Bieman et al. ........... 356/241.1 |
| 6,069,698 A | | 5/2000 | Takizawa et al. |
| 6,646,748 B2 | * | 11/2003 | Nakamura et al. .......... 356/513 |
| 6,714,307 B2 | * | 3/2004 | De Groot et al. ........... 356/512 |

FOREIGN PATENT DOCUMENTS

| DE | 78 19 433 | 10/1978 |
| DE | 34 30 013 | 3/1985 |
| DE | 196 18 558 | 11/1997 |
| DE | 198 06 261 | 10/1998 |
| DE | 197 21 842 | 4/1999 |
| DE | 101 15 524 | 11/2001 |
| WO | WO 00 10047 | 2/2000 |

OTHER PUBLICATIONS

A. Donges, R. Noll, "Lasermesstechnick" [Laser Metrology] Hüthig Publishers 1993**.

P. de Groot, L. Deck, "Surface Profiling by Analysis of White–Light Interferograms in the Spatial Frequency Domain" J. Mod. Opt., vol. 42, No. 2, 389–401, 1995**.

Th. Dresel, G. Häusler, H. Venzke, "Three–Dimensional Sensing of Rough surfaces by Coherence Radar", Appl. Opt., vol. 31, No. 7, 919–925, 1992**.

(Continued)

Primary Examiner—Gregory J Toatley Jr.
Assistant Examiner—Patrick Connolly
(74) Attorney, Agent, or Firm—Kenyon & Kenyon

(57) ABSTRACT

An optical measuring device includes a 3-D measuring set-up for measuring the shapes of test object surfaces in three dimensions, and projection optics including an objective optics, the test object being illuminated by a light source via an illuminating beam using an illuminating optics. A rapid, highly resolving measurement of surface shapes which are nearly radially symmetric is provided by configuring the objective optics as image-flattening optics for covering (measuring) and flattening a curved surface area or as panoramic optics for measuring a radially symmetric surface area that encircles 360°.

24 Claims, 6 Drawing Sheets

OTHER PUBLICATIONS

H.J. Tiziani, "Optical Methods for Precision Measurements", Optical and Quantum Electronics, vol. 21, 253–383, 1989**.

K. Creath, "Temporal Phase Measurement Method", d.W. Robinson, T. G. Reid: "Interferogram Analysis", IOP Publishing Bristol 1993**.

R. Onodera, Y. Ishii, "Two Wavelength Interferometry That Uses a Fourier Transform Method", Appl. Opt., vol. 37, No. 34, 7988–7994, 1998**.

J.H. McLeod, "Axicons and Their Uses", J. Opt Soc Am., vol. 50, No. 2, 166–169, 1960**.

* cited by examiner

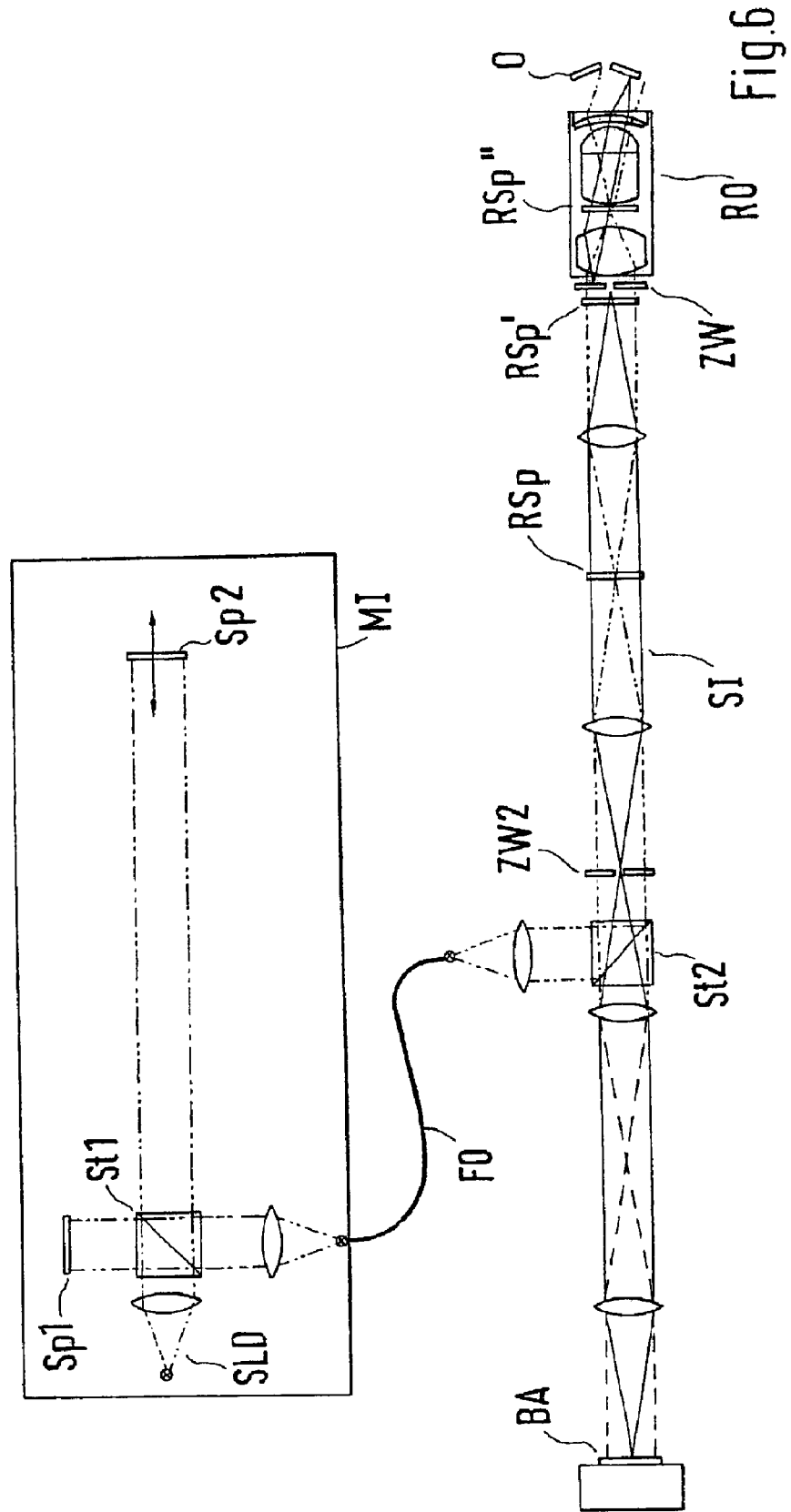

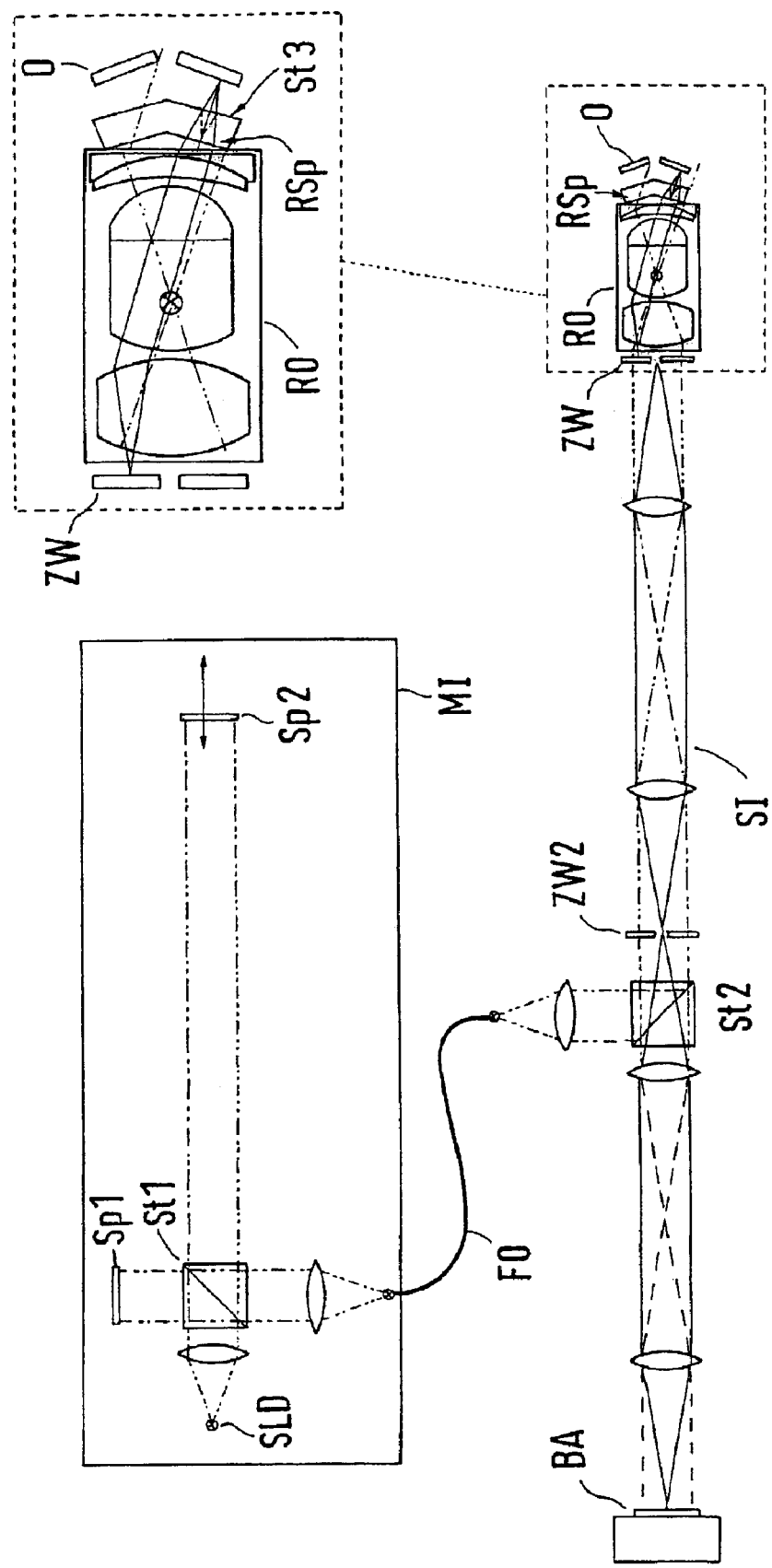

OPTICAL MEASURING DEVICE

FIELD OF THE INVENTION

The present invention relates to an optical measuring device having a 3-D measuring set-up for measuring the shapes of test object surfaces in three dimensions, and having projection optics including an objective optics, the test object being illuminated by a light source via an illuminating beam using an illuminating optics.

BACKGROUND INFORMATION

Optical measuring devices of this kind, for example, interferometric measuring devices, may be based on the principle of phase analysis, i.e., analyzing the transit time of the light or radiation, or they may be based on the triangulation method (e.g., fringe (strip) projection), where the measurement is made in dependence upon an observation angle and the illumination direction.

Among the interferometric methods, one may distinguish those of classic interferometry (see, e.g., A. Donges, R. Noll in "Lasermesstechnik" (Laser Metrology), Huethig Publishers 1993), of white-light interferometry, where light sources of short coherence length are used (e.g., light-emitting diode, superluminescent diode) (compare P. de Groot, L. Deck, "Surface Profiling by Analysis of White-Light Interferograms in the Spatial Frequency Domain" J. Mod. Opt., vol. 42, no. 2, 389–401, 1995; Th. Dresel, G. Haesler, H. Venzke; "Three-Dimensional Sensing of Rough surfaces by Coherence Radar", Appl. Opt., vol. 31, no. 7, 919–925, 1992; German Published Patent Application No. 199 48 813 and German Published Patent Application No. 100 15 878) and of heterodyne interferometry (see, e.g., German Published Patent Application No. 197 21 842; H. J. Tiziani, "Optical Methods for Precision Measurements", Optical and Quantum Electronics, vol. 21, 253–282, 1989; K. Creath, "Temporal Phase Measurement Method" in d. W. Robinson, T. G. Reid: "Interferogram Analysis", IOP Publishing Bristol 1993; R. Onodera, Y. Ishii, "Two-Wavelength Interferometry That Uses a Fourier Transform Method", Appl. Opt., vol. 37, no. 34, 7988–7994, 1998).

As discussed, for example, in the two named, non-prepublished German Patent Application Nos. 199 48 813.4 and 100 15 878.1, as well as in the two non-prepublished German Patent Application Nos. 100 33 027.4 and 100 33 028.2, which likewise deal with white-light interferometry, it may be difficult to measure relatively large surface areas, particularly within narrow cavities, quickly and at high resolutions. For example, objects having very small cone angles often may not be measurable using interferometers which work with a plane field of view (flat angular field), since light may not scatter back into the objective. When an endoscope is used, conical or cylindrical surfaces may only be measurable in small segments. Measuring the entire surface may be time-consuming, since many individual segments may need to be measured.

SUMMARY OF THE INVENTION

An object of an exemplary embodiment of the present invention is directed to providing an optical measuring device that may measure relatively large, contiguous surface areas of test objects quickly and at high resolutions.

This may be achieved by providing an objective optics configured as image-flattening optics for covering (measuring) and flattening a curved surface area (for example, saddle surface, conical (or tapered) segment) or as panoramic optics for measuring a radially symmetric surface area that encircles 360°. The surface area to be measured, which may be illuminated by illumination optics, for example, even at hard-to-reach places, in a simple and defined manner, may be covered by the panoramic optics in a cohesive and, thus, highly resolving manner, and quickly, and maybe measured in three dimensions by the measuring device. In this connection, surface inaccuracies may be measurable, for example unwanted roughness, imprecise cylindrical bores or conical valve seats, and also transitional regions between conical valve seats and cylindrical surfaces, and not only those surfaces extending in the depth direction, but flat areas as well. With image-flattening optics, a substantially curved surface area, e.g., a substantially curved section of a valve seat, may be measured.

The panoramic optics may be designed in such a manner that the covered surface area is imaged as a (not necessarily plane) intermediate image.

For further measured-value acquisition and analysis, the panoramic optics or image-flattening optics may be arranged such that the covered surface area is imaged in one plane as a flattened image, directly on the image recorder, or as a flattened intermediate image.

A simple and, in this context, accurate and fast measurement may be facilitated by arranging the illumination optics, which may include the panoramic optics or the image-flattening optics and further optics, such that the wavefront illuminating the test object is adapted to the geometry of the surface area, so that the illuminating beams may impinge normally upon the surface area.

Alternative exemplary embodiments may arrange the panoramic optics or the image-flattening optics to correspond to a wide-angle objective lens having an angular magnification substantially greater than one, and to a telecentric system, or to a normal-angle objective having an angular and linear magnification of one and a deflection set-up. In the case of the wide-angle optics having a telecentric system, the aperture stop (diaphragm) may be situated outside of the panoramic optics and, on the object side, each beam may have a different pupil. In this manner, the parallel beams of the image side may be converted on the object side into beams which may be normal, for example, to a conical surface (or cylindrical surface).

A further exemplary embodiment may provide for the deflection set-up to be arranged as an axicon, in the form of a rotationally symmetric prism or as a rotationally symmetric mirror. For the arrangement of axicons, a description may be found in J. H. McLeod, "Axicons and Their Uses", J. Opt Soc Am., vol. 50, no. 2, 166–169, 1960, as well as in G. Schroeder, "Technische Fotographie" (Technical Photography), Vogel Publishers, 74–77, 1981.

Various suitable arrangements of panoramic optics or of image-flattening optics may include spherical, aspherical, or Grin lenses, rod lenses, diffractive optical elements, prisms, mirrors, or a combination of some or of all of these components.

Alternative exemplary embodiments may provide for the 3-D measuring set-up to be an interferometric measuring set-up or a measuring set-up that is based on the triangulation method and, additionally, for the interferometric measuring set-up to be fabricated as a normal interferometer, heterodyne interferometer or white-light interferometer, which may have a short-coherent light source.

Measures for positioning the measuring device in relation to the object and for performing the measurement may be derived in that the white-light interferometer includes an object arm in which the panoramic optics or the image-flattening optics may be mounted and which the illuminating beam runs at least partially, and also has a reference arm including a reference mirror, and that the reference arm and the object arm extend such that they may be spatially separate from one another, or they may be spatially integrated in one another in a common path configuration. If provision is made, in this context, for the white-light interferometer to be divided into a modulation interferometer and a probe interferometer that is coupled via a fiber optics or a free-space optics to the panoramic optics, then the operation (handling) may be further facilitated.

To compensate for the panoramic optics or the image-flattening optics, optics similar or equivalent thereto may be employed in the reference arm.

Various possible embodiments, which, depending on the measuring task, may be suitably selected, and may be derived in that a relative change in the optical path length between the object light path and the reference light path may follow in different ways when working with the white-light interferometer, e.g., by moving a reference mirror, by moving the object, by moving the interferometer, by changing the optical path length in the reference arm using an acoustooptical modulator or by depth scanning of the intermediate image.

Various options for measuring different surfaces even in hard-to-reach places may also be provided in that an optics assembly that is rigid with respect to the test object may be arranged in the object arm, and in that the rigid optics assembly may be followed by an optics assembly that is movable in the direction of its optical axis. In this context, given a proper handling, a relatively large lateral resolution may be achieved, even in narrow cavities, when the rigid optics assembly is fully or partially configured as an endoscope.

By applying the measure whereby the rigid optics assembly is part of an optics assembly that generates the intermediate image, one may further reduce the outlay entailed in adapting the measuring device to various measuring tasks. A refinement may include, for example, a rigid optics assembly as part of the panoramic optics or image-flattening optics.

To achieve a robust measurement with respect to the relative lateral movement of the test object, the rigid optics assembly may form images of the test object toward infinity.

The accuracy of the measurement may be further enhanced by the measures whereby an image of the reference plane of the reference arm lies in the depth of focus range of the panoramic optics or of the image flattening optics. In this connection, the image of the reference plane may lie in the image plane of the panoramic optics or of the image-flattening optics and, furthermore, that in response to movement of the movable optics assembly, the image of the reference plane may move synchronously with the image plane of the panoramic optics or of the image-flattening optics.

Another exemplary embodiment of the present invention may be derived by arranging the rigid optics as panoramic optics or as image-flattening optics, which may be used to generate at least one intermediate image that may be rigid with respect to the test object, and by configuring, as a movable optics assembly, an objective optics that may follow behind the rigid intermediate image in the optical path of rays so as to be movable in the direction of its optical axis, for scanning the intermediate image that may be aligned normally to this axis, in the depth direction, and for imaging the same on the image recorder directly or via one or more intermediate images. Because the rigid intermediate image of the object surface arranged, for example, in the object light path, may be formed by the rigid intermediate-image imaging device in the form of panoramic optics or image-flattening optics in the object light path, the object surface to be measured may be measured at a relatively high lateral resolution, even in narrow channels or boreholes, and may be analyzed with respect to the depth structure using the image recorder and the downstream evaluation unit. The rigid intermediate image may be scanned using relatively simple measures, since only a few optical components of the object light path may need to be moved to scan its depth, the scanned depth of the rigid intermediate image, in each instance, may remain within the depth of focus range of the movable objective optics, since, due to the depth scanning (depth scan), the object plane of the moving objective optics may be moved, so to speak, through the rigid intermediate image, and, in this manner, for example, the interference maxima may be analyzed in the range of the greatest focus depth. Moreover, the rigid intermediate image may be aligned or aligned normally to the moving direction of the objective optics including the panoramic optics or image-flattening optics.

The imaging quality and the accuracy of the evaluation may be enhanced by the feature that the intermediate image may have the same linear magnification for all object points imaged in the intermediate image. In this context, the rigid optics assembly may be configured as a 4f array.

With respect to closely related arrangements of rigid and movable optics assemblies, reference may be made to the exemplary embodiments in German Published Patent Application No. 101 15 524, which may be incorporated accordingly for the subject matter of the present application.

Another way to adapt the measuring device to a given surface structure of the test object may be to provide at least two panoramic optics or image-flattening optics and to arrange them such that a flattened image or intermediate image is able to be produced simultaneously from at least two surface regions, a reference plane being provided in the reference arm, and the images or the intermediate images being analyzed in time succession, or a number of assigned reference planes corresponding to the number of panoramic optics or image-flattening optics being provided, and the analysis occurring synchronously.

By using the panoramic or image-flattening optics, the surface of the object may be illuminated and observed virtually perpendicularly (normally or vertically), so that measurements may be possible, in particular even when working with very small cone angles or narrow bores. Employing the panoramic optics, the test object may be measured in one single recording (exposure) in an annular section or, depending on the surface properties, even completely measured.

In this context, the panoramic optics or the image-flattening optics may be arranged in such a manner that the surface of the object is imaged directly, or via a telecentric imaging or an intermediate image (in accordance with German Published Patent Application No. 199 48 813) on the image recorder.

BRIEF DESCRIPTION OF THE DRAWINGS

FIG. 6 shows an exemplary design of the optical measuring device including a white-light interferometer, where separation into modulation interferometer and probe interferometer is made.

FIG. 7 shows another exemplary embodiment of the optical measuring device, including a white-light interferometer divided into a modulation interferometer and a probe interferometer, where, in comparison to FIG. 6, the reference mirror of the probe interferometer is differently arranged.

DETAILED DESCRIPTION

FIGS. 1A through 1D show various exemplary embodiments of a panoramic optics RO which may be employed in different structural forms of the optical measuring device, in particular the optical measuring devices shown in FIGS. 2 through 7, in the form of white-light interferometers (short-coherent interferometers).

Figure 1A:
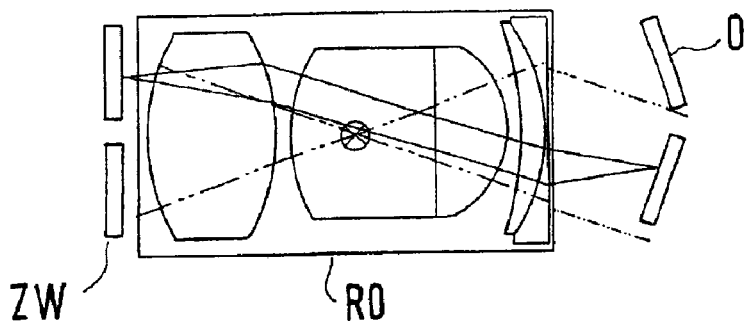
FIG. 1A shows an exemplary embodiment of a panoramic optics of an optical measuring device, and also shows test object(s) having different surface region(s).
Figure 1B:
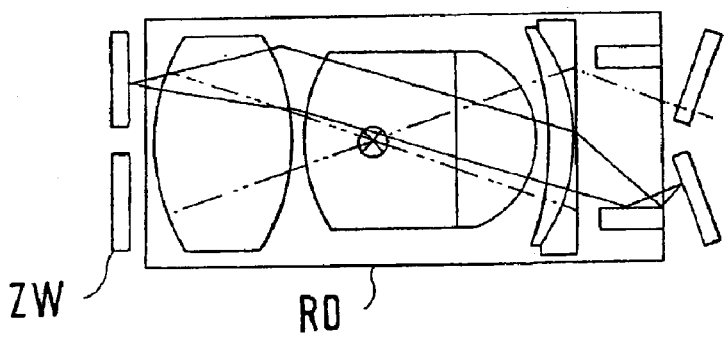
FIG. 1B shows another exemplary embodiment of a panoramic optics of an optical measuring device, and also shows test object(s) having different surface region(s).
Figure 1C:
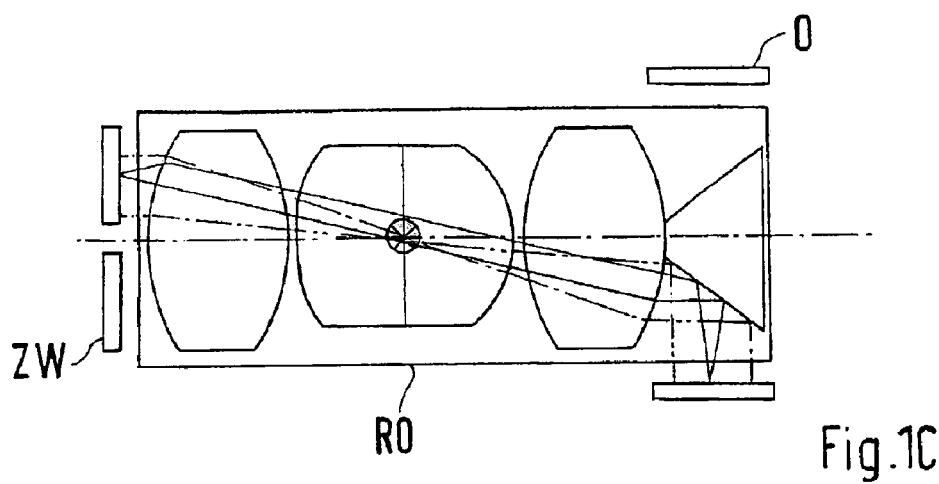
FIG. 1C shows another exemplary embodiment of a panoramic optics of an optical measuring device, and also shows test object(s) having different surface region(s).
Figure 1D:
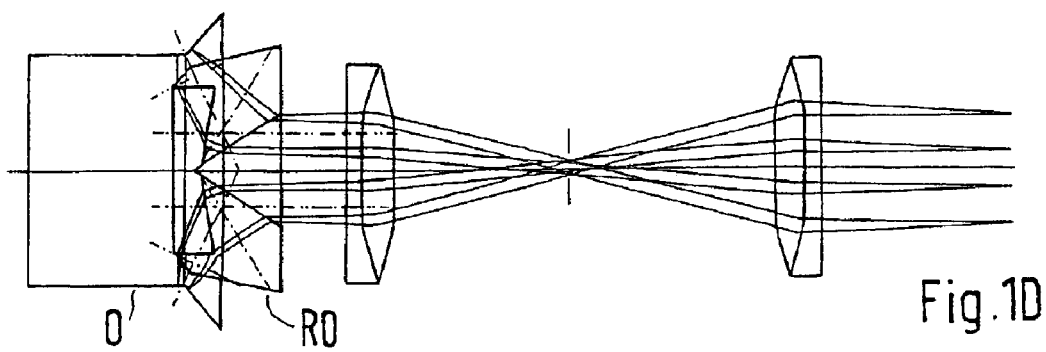
FIG. 1D shows another exemplary embodiment of a panoramic optics of an optical measuring device, and also shows test object(s) having different surface region(s).
Figure 2:
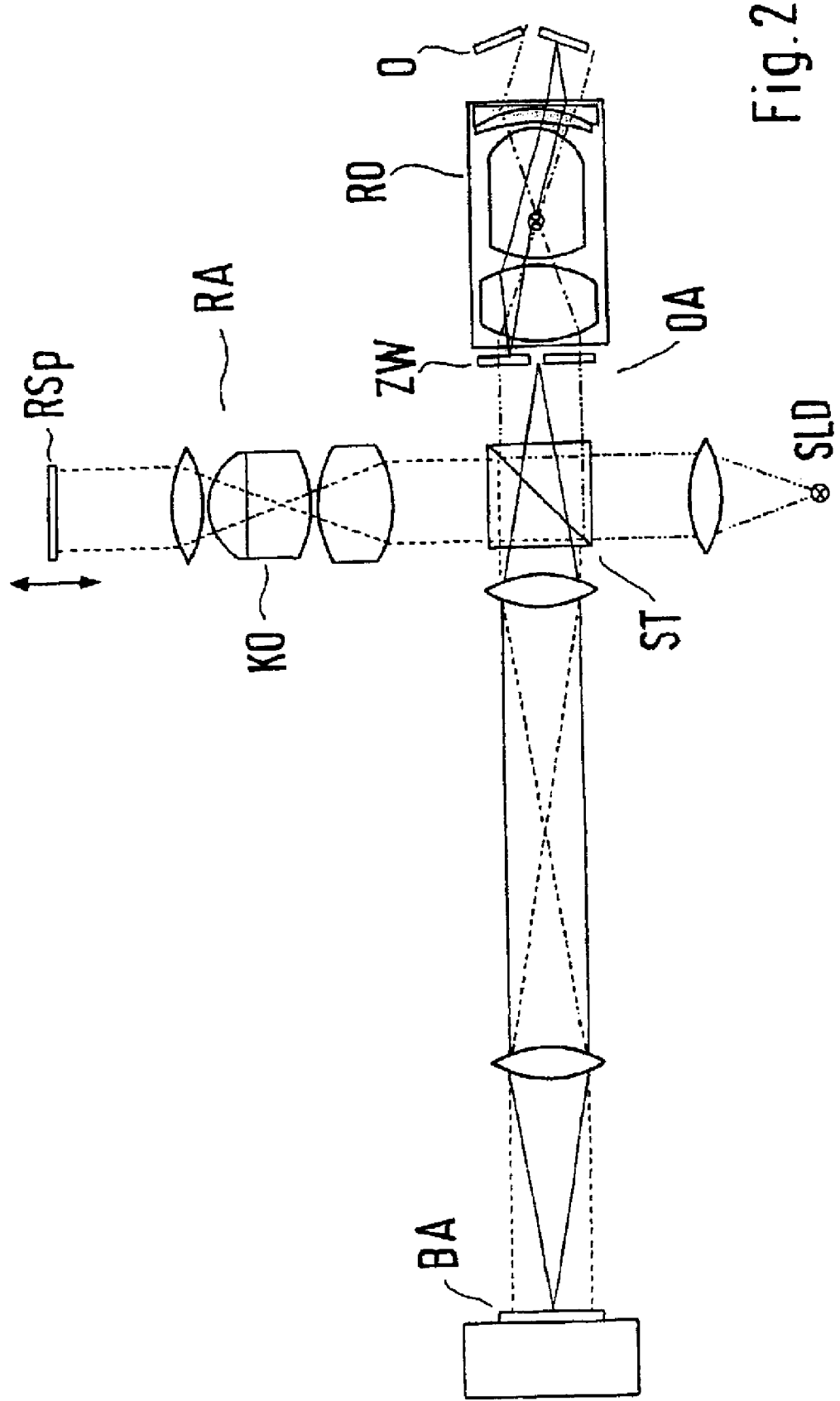
FIG. 2 shows an optical measuring device configured as a white-light interferometer, including a panoramic optics according to FIG. 1A and a flattened intermediate image.

As FIG. 2 shows, a panoramic optics RO, appropriately configured for the measuring task, positioned in an object arm OA in front of (upstream from) a test object O, i.e., its surface region to be measured, which here represents the surface of an inner cone, for example. Accordingly, panoramic optics RO may also be configured for the outer surface of a cone in accordance with FIG. 1B, or for the inner surface of an inner cylinder or of a bore in accordance with FIG. 1C, or for a transitional region between a conical surface and a bore in accordance with FIG. 1D. In this context, panoramic optics RO may be an objective, for example, which is configured similarly to a wide-angle objective (angular magnification substantially different from 1) and be thereby implemented virtually as a telecentric configuration. The aperture stop may be arranged outside of panoramic optics RO, and, on the object side, each beam may have a different pupil. In this manner, the parallel beams of the image side are converted on the object side into beams which are normal, for example, to a conical surface (or cylindrical surface). Alternatively, a classic objective may also be used, for example, having an angular, as well as linear magnification of 1, however including a deflection system, e.g., an axicon. The axicon may either be a rotationally symmetric prism which works during transmission, or a rotationally symmetric mirror which works during reflection. Panoramic optics RO may be implemented either with spherical, aspherical, or Grin lenses, rod lenses, diffractive optical elements, prisms, mirrors, or a combination thereof. A panoramic optics configuration may include an annular or also a circular section of a flat surface that is illuminated and covered (taken in). In this context, the covered surface regions are radially symmetric.

Moreover, two or more panoramic optics RO may be positioned and configured such that, besides from one surface region, a flattened image or intermediate image is able to be produced simultaneously from at least one further surface region (as described in the German Published Patent Application No 100 33 028).

Then, proportionately to the number of further surface regions, at least one further reference plane (reference mirror) may be positioned in the reference light path to generate different optical lengths (in accordance with German Published Patent Application No. 100 33 027). With this set-up, the position of a guide bore leading to a spatially separate valve seat may be measured, for example.

Figure 3:
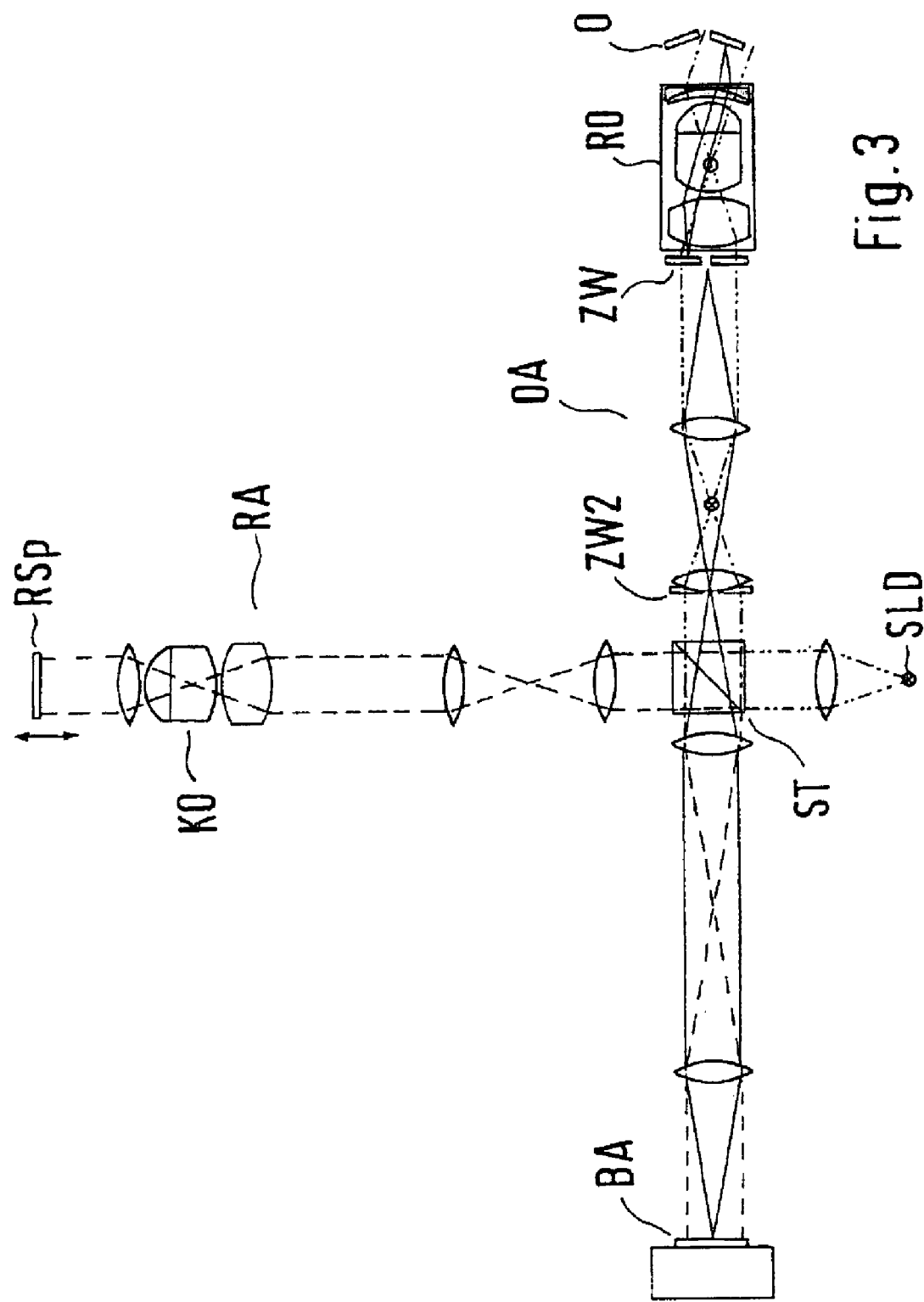
FIG. 3 shows another exemplary embodiment of the optical measuring device, where, in comparison to FIG. 2, an additional intermediate image is produced.

If white-light interferometry (short-coherence interferometry) is applied as a measuring method, then the configuration may be implemented, for example, as a Michelson interferometer in accordance with FIG. 2. The light from a short-coherent light source SLD, for example from a superluminescent diode or light-emitting diode, is coupled via a beam splitter ST into the two interferometer arms constituted by object arm OA and reference arm RA. Test object O is illuminated through panoramic optics RO. In this context, the object surface may be illuminated through a wavefront which is adapted to the geometry of test object O. Through panoramic optics RO, an annular section (encircling 360°) of the object surface, for example, is imaged by panoramic optics RO into a plane: a flattened intermediate image ZW is formed. The flattened intermediate image may be produced directly on an image recorder BA, e.g., a CCD camera, or be imaged thereon, or provided by further intermediate images, as shown in FIG. 3. Following optoelectric conversion, the signals obtained from the object surface may be properly analyzed in an evaluation unit (not shown).

In reference arm RA, the reference wave is reflected by reference mirror RSp which moves in accordance with the double arrow. To compensate for panoramic optics RO, a compensation optics KO, similar or corresponding to panoramic optics RO, is employed in reference arm RA. However, it may predominately image (forms an image of) a flat reference mirror RSp again into a plane. If an optics assembly identical to panoramic optics RO is used for purposes of compensation, then a reference mirror having virtually the same geometry as the object surface to be measured may be needed, as shown in FIG. 4.

The image of the object surface, superimposed with the reference wave, may be recorded on image recorder BA.

To perform the measurement, the optical path difference between the optical path lengths in object arm OA and in reference arm RA is changed (depth scanning, depth scan), (e.g., scanning of reference mirror RSp, scanning of the object, intermediate image scan in accordance with German Published Patent Application No. 100 15 878, scanning by acoustooptic modulators in accordance with German Published Patent Application No. 197 21 842).

Figure 4:
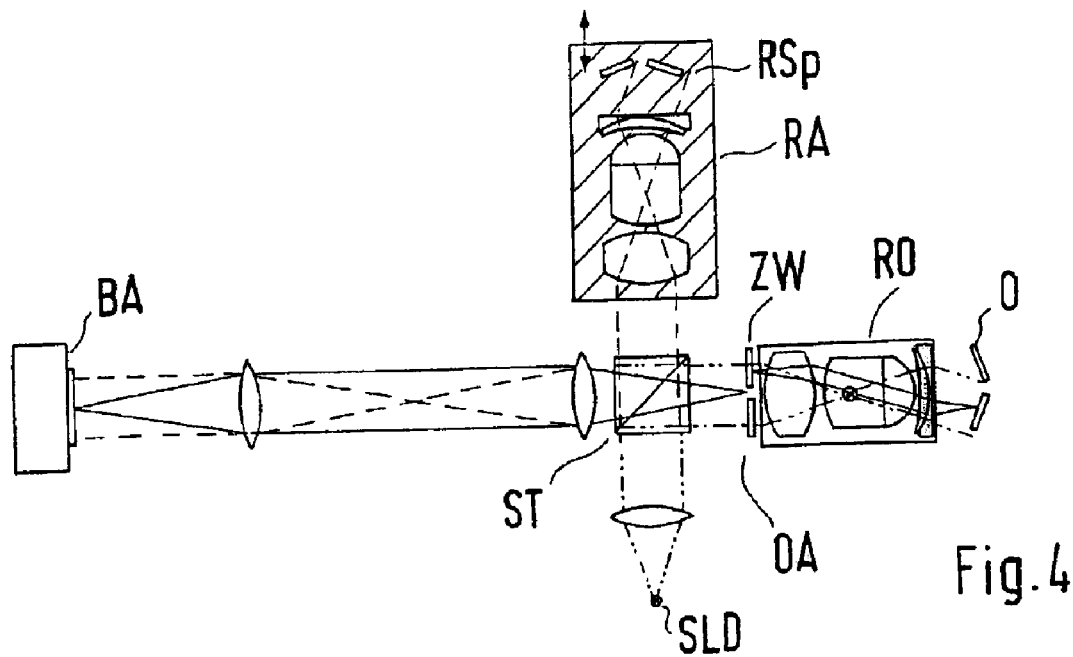
FIG. 4 shows another optical measuring device in the form of a white-light interferometer, where, in comparison to FIG. 2, the reference arm is altered.
Figure 5:
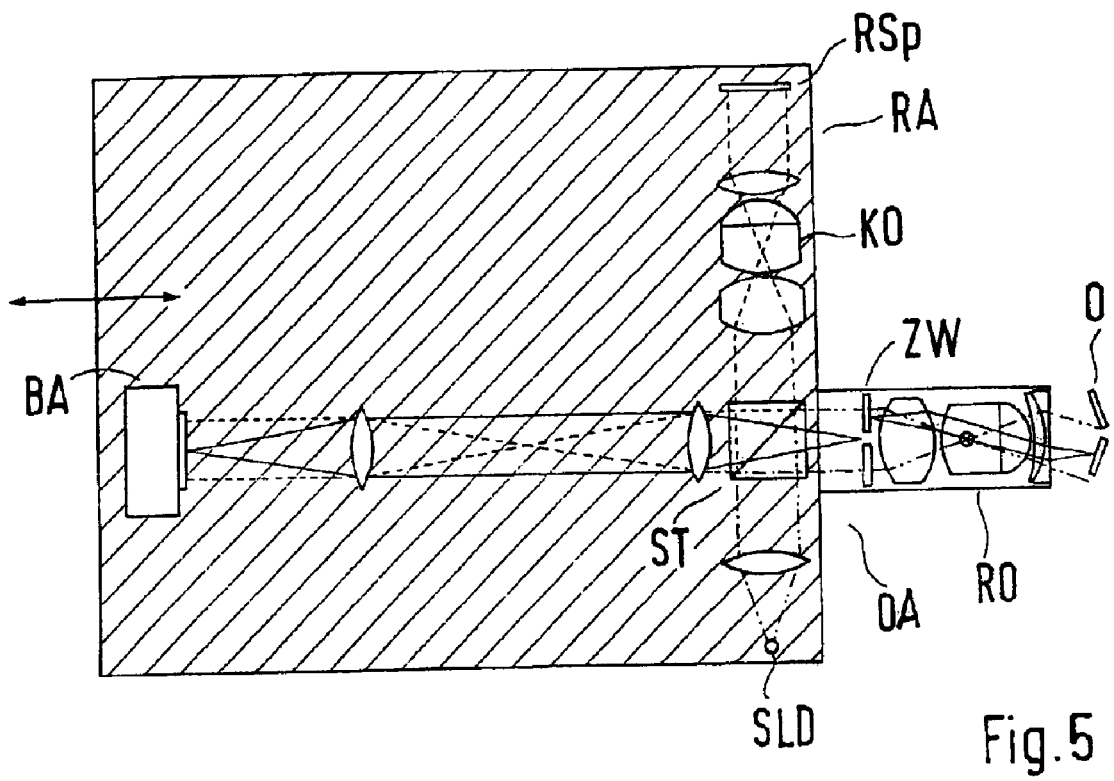
FIG. 5 shows another exemplary embodiment of the optical measuring device including a white-light interferometer, where, the parts that move during depth scanning (shown with broken lines) are combined differently than in the preceding exemplary embodiments.

In the case of white-light interferometry, the depth scan may be performed using a plane reference mirror RSp (FIG. 2) or a reference mirror RSp adapted to the geometry of the object surface (FIG. 4) by shifting only reference mirror RSp or reference mirror RSp using the compensating optics assembly, as shown in FIG. 4 (broken-line area). Panoramic optics RO may also be employed as so-called bayonet optics (in accordance with German Published Patent Application No. 100 15 878.1). The depth scanning is then performed in that flattened intermediate image ZW is scanned by a movable objective optics in the depth direction, as shown in FIG. 5, where the moving part is shown with dotted lines (as in FIG. 4 as well).

In the image of the object surface on image recorder BA, high interference contrast may occur when the optical path difference in both interference arms OA, RA is smaller than the coherence length. Various methods for obtaining the 3D contour profile (elevation of surface features) of the object surface may have been established within the field of white-light interferometry.

A basis of these methods may be, for measuring purposes, to change the optical path length of the object light path in relation to the optical path length of the reference light path, and to analyze the interferogram for each measuring point.

In the set-up according to FIG. 3, as compared to the set-up according to FIG. 2, an additional intermediate image ZW2 is generated in object arm OA using imaging elements (not shown in greater detail). For purposes of compensation, suitable optical elements are positioned in reference arm RA. Further imaging elements (not described more closely) are provided between beam splitter ST and image recorder BA (as also in FIG. 2 and the remaining figures).

The white-light interferometer may be implemented as a so-called "common path" arrangement in a modified configuration according to FIGS. 6 and 7. The white-light interferometer may be again illuminated by a broadband (short-coherent) light source SLD. A first beam splitter Sp splits the light into two arms, which have a first and a second mirror Sp1, Sp2. This partial interferometer is described in the following as modulation interferometer MI. The optical path difference between the two arms is greater than the coherence length of light source SLD.

From the two mirrors Sp1, Sp2, the reflected light is fed via first beam splitter St1 and a second beam splitter St2 into an optical probe (e.g., endoscope). This partial interferometer, made up of reference mirror RSp and the optical path of rays to test object O, including the optical components provided, is referred to in the following as probe interferometer SI. One feature of this configuration is that reference mirror RSp is located in the optical probe itself and may be arranged at various positions (RSp', RSp"). One portion of the light is reflected off of this reference mirror RSp (and, respectively, RSp', RSp"), while the other portion of the light illuminates the surface region of test object O to be measured. Reference mirror RSp may be mounted on a plane (parallel) plate or, for example, on a prism. The optical path difference predefined in modulation interferometer MI is canceled in probe interferometer SI by positioning the reference mirror accordingly.

Alternatively, probe interferometer SI may also be implemented as a Mirau interferometer, as shown by FIG. 7. Using panoramic optics RO, adapted, for example, to a conical object surface, test object O may be imaged onto image recorder BA, in some instances via intermediate images ZW, ZW2, and superimposed with the reference wave. To obtain the contour (elevation of surface features) information, mirror Sp2 is scanned over the measuring area. High interference contrast may occur in the image of test object O when the path difference between the two mirrors Sp1 and Sp2 is precisely the optical path difference between reference mirror RSp and test object O. To obtain the 3D contour profile (elevation of surface features), established methods may be used to analyze the interferograms in each image point. A benefit of this design may be that the object and reference waves propagate through virtually the identical optics assembly, so that aberrations may be substantially compensated for. Moreover, this set-up may be more rugged and, therefore, less susceptible to mechanical shocks.

Furthermore, as shown in FIGS. 6 and 7, modulation interferometer MI is coupled to probe interferometer SI via a fiber optics FO; this may be equally possible via free-space optics.

Alternatively, the optical path length in reference arm RA may also be changed by acoustooptic modulators (scanned through) (compare German Published Patent Application No. 197 21 842).

As a further exemplary embodiment, the common-path interferometer may be implemented in the Mirau set-up, also without modulation interferometer MI. Light source SLD may then be coupled directly into probe interferometer SI, e.g., via beam splitter St2 in accordance with FIG. 7. For the depth scanning, the actual reference mirror must then be moved toward the beam splitter. FIG. 7 depicts reference mirror RSp of probe interferometer SI between panoramic optics RO and test object O in properly adapted form, and an enlarged detail of a third beam splitter ST3 in a partial sketch.

In other interferometric methods (not discussed here) (e.g., classic interferometry, heterodyne interferometry, speckle pattern interferometry) or ESPI (electronic speckle pattern interferometry,) suitable adaptations may apply for the depth scanning and for the analysis, accordingly.

Appropriate mounted accessories and measures may also be employed in conjunction with an image-flattening optics that only records a partial section of a curved surface, but otherwise, in accordance with panoramic optics RO, may be integrated in the measuring device.

What is claimed is:

1. An optical measuring device for measuring a shape of a surface of a test object in three dimensions, a light source illuminating the test object via an illuminating beam using illuminating optics, comprising:

a 3-D measuring arrangement; and projection optics, including one of objective optics and panoramic optics, the objective optics being arranged as image-flattening optics to measure and flatten a curved surface area, the panoramic optics being arranged to measure a radially symmetric surface area encircling 360°;

wherein the 3-D measuring arrangement is one of an interferometric measuring set-up and a triangulation based measuring set-up.

2. The measuring device of claim 1, wherein the interferometric measuring set-up includes one of a normal interferometer, a heterodyne interferometer, and a white-light interferometer, including a short-coherent light source.

3. The measuring device of claim 2, wherein:

the white-light interferometer includes an object arm and a reference arm, each of the arms being arranged to extend such that they are one of spatially separate from one another and spatially integrated in one another in a common path configuration;

the reference arm includes a reference mirror;

one of the panoramic optics and the image-flattening optics is mounted in the object arm; and an illuminating beam is runnable at least partially via the object arm.

4. The measuring device of claim 3, wherein the reference arm includes another optics, the another optics including one of another panoramic optics and another image-flattening optics.

5. The measuring device of claim 3, wherein the white-light interferometer includes a modulation interferometer and a probe interferometer coupled together via one of fiber optics and free-space optics, including one of the panoramic optics and the image-flattening optics.

6. The measuring device of claim 2, wherein a relative change in an optical path length between an object light path and a reference light path is provided when working with the white-light interferometer, by one of moving a reference plane, moving the test object, moving the interferometer, changing the optical path length in the reference arm using an acousto-optical modulator, and depth scanning of an intermediate image.

7. The measuring device of claim 2, further comprising:
a rigid optics assembly arranged in the object arm, the rigid optics assembly being rigid in relation to the test object; and
a movable optics assembly arranged to follow the optics assembly, the movable optics assembly being movable in a direction of its optical axis.

8. The measuring device of claim 7, wherein the rigid optics assembly is arranged one of fully and partially as an endoscope.

9. The measuring device of claim 7, wherein the rigid optics assembly is part of an optics assembly arranged to generate an intermediate image.

10. The measuring device of claim 7, wherein the rigid optics assembly is a part of one of the image-flattening optics and the panoramic optics.

11. The measuring device of claim 7, wherein the rigid optics assembly is arranged to form images of the test object toward infinity.

12. The measuring device of claim 2, further comprising a reference arm, wherein an image of a reference plane of the reference lies in a depth of a focus range of one of the panoramic optics and the image-flattening optics.

13. The measuring device of claim 12, wherein the image of the reference plane lies in an image plane of one of the panoramic optics and the image-flattening optics.

14. The measuring device of claim 12, wherein in response to a movement of the movable optics assembly, the image of the reference plane moves synchronously with an image plane of one of the panoramic optics and the image-flattening optics.

15. The measuring device of claim 7, wherein:
the rigid optics assembly includes one of panoramic optics and image-flattening optics, and is operable to provide at least one intermediate image that is rigid with respect to the test object; and
the movable optics assembly is movable in a direction of its optical axis, and includes objective optics arranged behind an intermediate image in an optical path of rays, the movable optics assembly being operable to scan and image the intermediate image on an image recorder one of directly and via at least another intermediate image.

16. The measuring device of claim 15, wherein the intermediate image has a same linear magnification for all object points imaged in the intermediate image.

17. The measuring device of claim 16, wherein the rigid optics assembly includes a 4f array.

18. The measuring device of claim 2, wherein the panoramic optics include at least two panoramic optics and the image flattening objects include at least two image flattening optics, and the objective optics are operable to provide simultaneously one of a flattened image and an intermediate image from at least two surface regions, the measuring device further comprising:
a reference arm associated with at least one reference plane, wherein one of a quantity of the at least one reference plane corresponds to a quantity of the at least two optics, and the images are synchronously analyzable in time succession.

19. The measuring device of claim 1, wherein the panoramic optics is arranged so that a measured surface area is imaged as an intermediate image.

20. The measuring device of claim 1, wherein one of the panoramic optics and the image-flattening optics is arranged so that a measured surface area is imaged one of as a flattened intermediate image and as a flattened image in one plane directly on an image recorder.

21. The measuring device of claim 1, wherein:
the illumination optics includes further optics, and is arranged so that a wavefront illuminating the test object is adapted to a geometry of the surface area, so that illuminating beams impinge normally upon the surface area.

22. The measuring device of claim 1, wherein one of the following is provided:
the objective optics lens includes a wide-angle objective having an angular magnification substantially greater than one, and a telecentric system;
the panoramic optics includes a normal-angle objective lens having an angular and linear magnification of one and a deflection set-up.

23. The measuring device of claim 22, wherein the deflection set-up is configured as an axicon, as one of a rotationally symmetric prism and a rotationally symmetric mirror.

24. The measuring device of claim 1, wherein one of the panoramic optics and the image-flattening optics include at least one of a spherical lens, an aspherical lens, a Grin lens, a rod lens, a diffractive optical element, a prism, and a mirror.

* * * * *